June 27, 1950  H. A. THOMPSON  2,512,817
ROTATABLE HEAD LAMP ASSEMBLY
Filed June 25, 1947  2 Sheets-Sheet 1
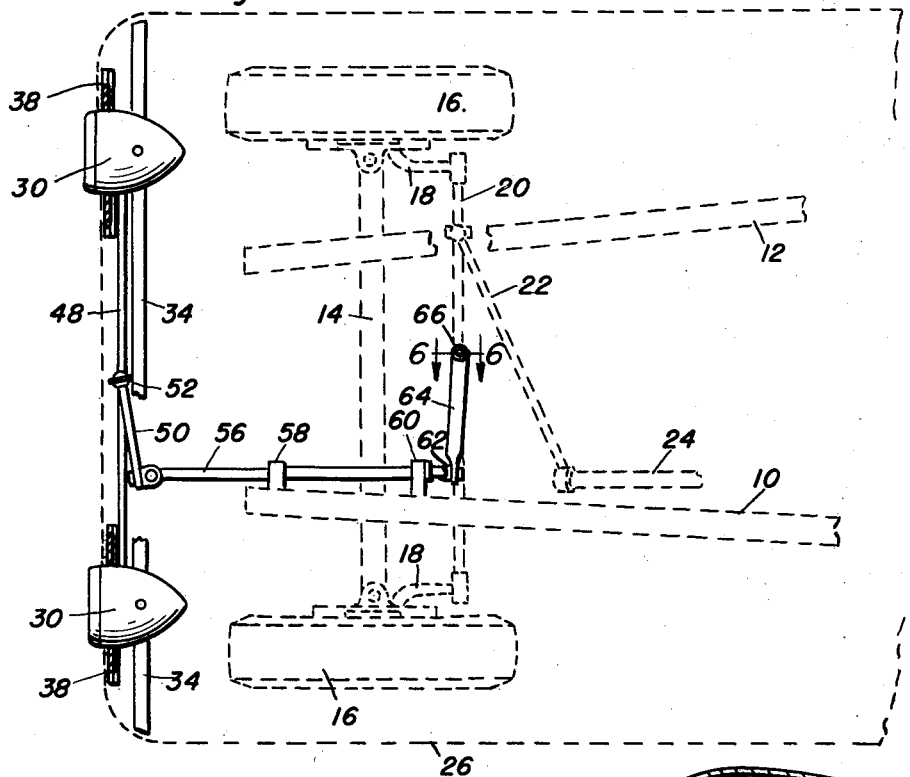
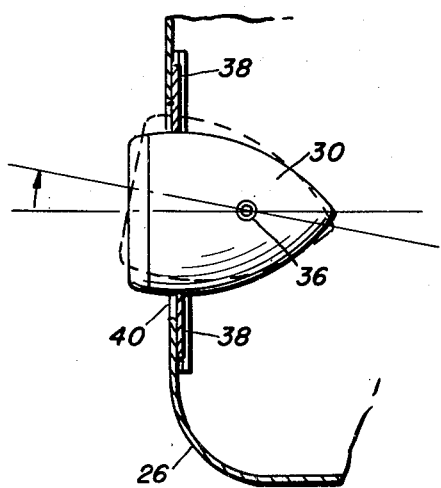
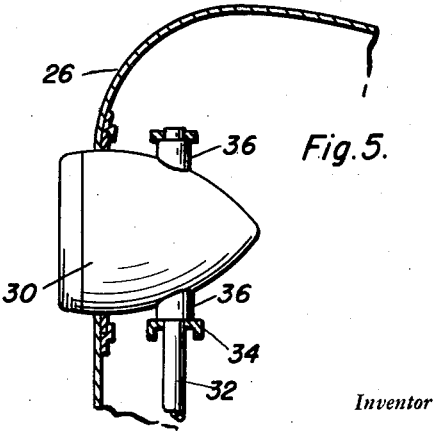
Inventor
Henry A. Thompson
By Clarence A. O'Brien
and Harvey B. Jacobson
Attorneys June 27, 1950  H. A. THOMPSON  2,512,817
ROTATABLE HEAD LAMP ASSEMBLY
Filed June 25, 1947  2 Sheets-Sheet 2

Inventor

Henry A. Thompson

By *Clarence A. O'Brien and Harvey B. Jackson*
Attorneys

Patented June 27, 1950

2,512,817

UNITED STATES PATENT OFFICE 2,512,817

ROTATABLE HEAD LAMP ASSEMBLY

Henry A. Thompson, Heber Springs, Ark.

Application June 25, 1947, Serial No. 756,899

1 Claim. (Cl. 240—62.72)

This invention relates generally to headlamps for vehicles and more particularly to a system whereby the headlamps of a vehicle are automatically turned through a limited arc, in a horizontal plane, corresponding directionally with any change in the angular disposition of the front wheels of an automotive vehicle, the device being applicable for use with certain types of air and water transport means wherein additional structure is available to release this automatic control system for non-automatic control when desired, the device being illustrated in this application for patent as applied to an automobile or truck where no such release is required.

It is well understood that devices of the same general character as this device have been developed and patented, and a patent covering the basic structure of such devices is not hereby sought, but what is sought to be secured by Letters Patent includes the particular combination of elements of structure described hereinafter and the refinements and improvements therein, whereby a simplified structure is adapted to better perform the operations required thereof.

It is a primary object of this invention, therefore, to provide a simplified structure for the automatic angular adjustment of headlamps so that these headlamps will at all times directionally correspond with the angular disposition of the front wheels of an automotive vehicle with reference to the frame, or more exactly, to provide for the turning of the headlamps in the direction in which the vehicle rather than the wheels is being turned, this latter provision being accomplished in large measure by properly proportioning the lengths of the bell cranks in the control system.

Another object of this invention is to provide a system of this character in which all the major parts are designed for manufacture in sturdy, easily lubricated form, obviating the necessity of adjustment or frequent repair.

And a last object to be specifically mentioned is to provide a headlamp control system which is relatively inexpensive and practicable to manufacture, simple and easy to install on many types of automotive vehicles, and which will give generally efficient and durable service.

With these and other objects definitely in view, this invention comprises certain novel features of construction, combination and arrangement of parts and portions as will be described in detail hereinafter, and particularly pointed out in the claim hereunto appended, a preferred embodiment of the invention being illustrated in the accompanying drawings which form a material part of this disclosure and in which—

Figure 1 is a top plan view of this improved system for headlamp control, a particular environment wherewith this invention may be used, the wheels and forward portion of an automobile being shown in dash lines;

Figure 4 is a fragmentary enlarged detail plan view of a headlamp and contiguous structure, the lamp being shown in a second position in dash line;

Figure 5 is a side elevational view of the same;

Figure 2:
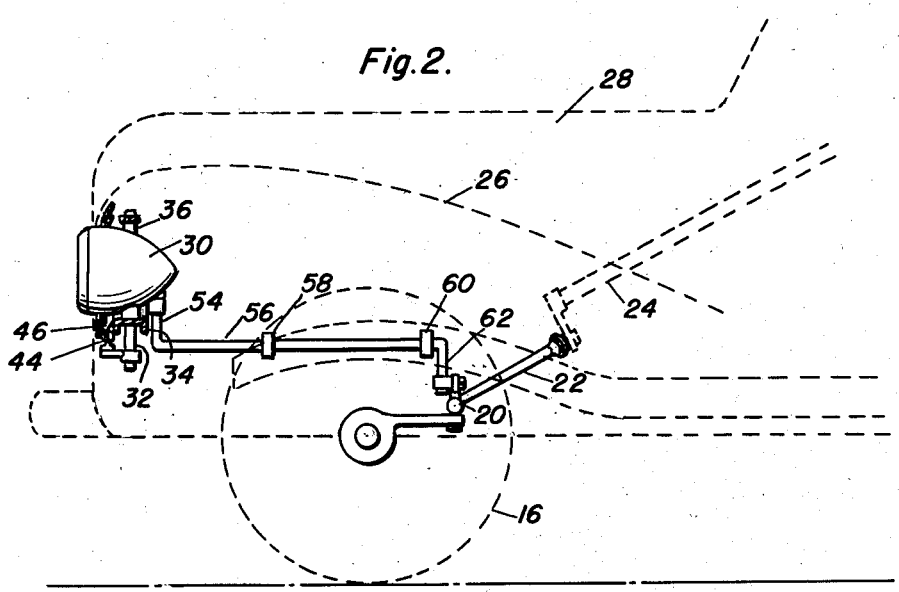
Figure 2 is a side elevational view of the same structure as that illustrated in Figure 1.
Figure 3:
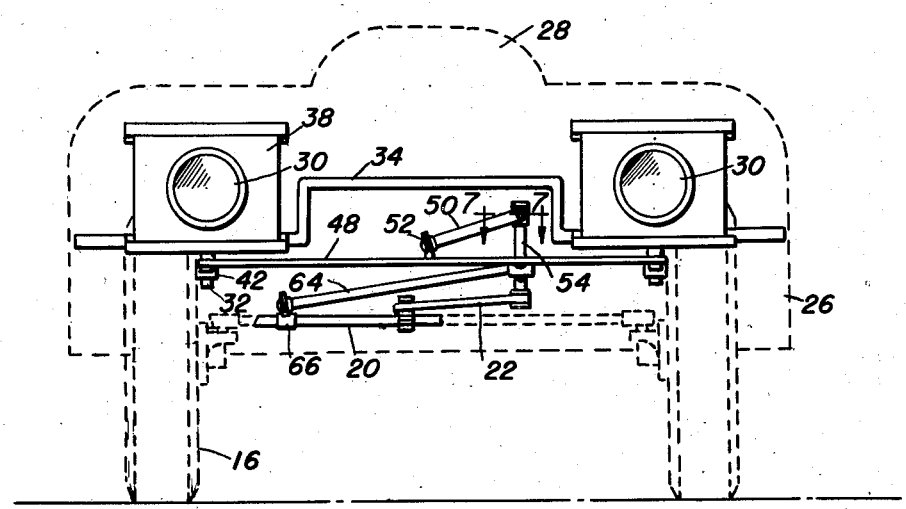
Figure 3 is a front elevational view of the same.
Figures 6, 7:
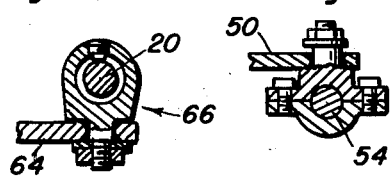
Figure 6 is a vertical transverse sectional view, taken on the line 6—6 in Figure 1.
Figure 7 is a vertical transverse sectional view taken on the line 7—7 in Figure 3.

Referring now to these drawings in detail, the environment wherewith this invention is to be used is illustrated in dash line as including the lower frame members 10 and 12 of an automobile or truck, the front axle 14, pivotally mounted front wheels 16, steering knuckles 18, tie rod 20, steering push rod 22 and steering column 24. All of these parts are unaffected by this invention and operatively connected and function in a well-known manner. The drawings also indicate the front fenders 26 and the cowl 28 of an automobile.

The headlamps 30 are mounted on vertical shafts 32 which are rotatively mounted on a rigid member 34 which is, in turn, rigidly secured to the fore part of the vehicle by any suitable means which will vary according to mechanical expediency in adapting this invention to any particular vehicle. In the drawings, the headlamps are provided with bearing members 36 which are rigidly secured to the shafts 32 and bear upon the upper surface of the rigid member 34.

This rigid member 34 is provided to assure the retention of the original spacing of the headlamps 30. The headlamps extend through plates 38 horizontally slidably mounted on the fenders 26 which are apertured as at 40 to allow the headlamp to rotate through a limited arc, the plates closing portions of said apertures on each side of the lamps.

On the lower end of each vertical shaft 32 there is rigidly secured a bell crank 42 provided with a ball 44 seated within a socket 46 on each end of a cross link member 48. A link 50 is universally jointed to said cross link member as at 52 and similarly jointed to a second bell crank 54 on the forward end of a shaft 56. This shaft 56 is rotatively mounted in bearings 58 and 60 secured to the lower frame member 10. The rear end of the shaft 56 terminates in a third bell crank 62, to which is pivotally secured a link 64 connecting the bell crank 64 with the tie rod 20 by means of another universal joint 66.

The method of operation of this invention will be obvious from a consideration of the foregoing description of the mechanical details thereof, taken in connection with the above recitation of the objects sought to be achieved by this invention but, in recapitulation, it may be noted that operation of the steering mechanism causes the tie rod 20 to be moved transversely of the vehicle, whereupon the wheels 16 and the headlamps are simultaneously moved in corresponding directions. The shaft 56 in rotating causes a transverse movement of the cross link member 48 which, in turn, causes the front end of each headlamp to be moved with the wheels 16. When these lamps are lighted the beam of light thrown thereby will be deflected to a greater or lesser degree in accordance with the movement of the front wheels 16, the proportioning of the lengths of the bell cranks being the major element in determining the degree of deflection. It is preferred, however, to have the headlamps turned considerably whenever the wheels are turned in order to illuminate the course to be travelled by the moving vehicle if said wheels are not immediately shifted from this position.

Though there has been described one preferred embodiment of this invention, this application is not limited to this embodiment, but it is desired to limit the scope of this invention only in accordance with the following claim.

What is claimed as new and desired to be secured by Letters Patent is:

A rotatable head lamp assembly for use on a vehicle having a reciprocating member in the steering mechanism thereof and a front end portion, comprising a rigid member secured to said front end portion, a pair of said headlamps mounted for rotation about a vertical axis on said rigid member, front fenders having apertures registering with said headlamps and larger than said headlamps in diameter, a cross link member, bell cranks secured to each of said headlamps and to the ends of said cross link member, a shaft rotatively mounted longitudinally of the vehicle, a second bell crank linked to said link member and rigidly secured to said shaft a third bell crank rigidly secured to said shaft and linked to said reciprocating member of the steering mechanism, whereby uniform angular movement of the headlamps is achieved without reliance on retention of the exact form of said front end portion, and said cross link member being substantially parallel to said reciprocating member, said headlamps extending through said apertures in the fenders, and plates slidably mounted on said fenders and through which said headlamps extend, said plates closing the portions of said apertures on each side of the headlamps.

HENRY A. THOMPSON.

REFERENCES CITED

The following references are of record in the file of this patent:

UNITED STATES PATENTS

| Number | Name | Date |
|---|---|---|
| 1,186,129 | Putman | June 6, 1916 |
| 1,350,252 | Budd | Aug. 17, 1920 |
| 1,431,820 | Koesterer | Oct. 10, 1922 |
| 1,463,685 | Fisher | July 31, 1923 |
| 1,633,442 | Foster | June 21, 1927 |
| 1,788,917 | Keck | Jan. 13, 1931 |
| 1,805,589 | McKay | May 19, 1931 |